(No Model.)

C. F. LAVENDER.
WHEEL TIRE.

No. 503,704. Patented Aug. 22, 1893.

Witnesses: F. Gustav Wilhelm, Emil Neuhart

C. F. Lavender, Inventor.
By William Bonner, Attorneys.

UNITED STATES PATENT OFFICE.

CHARLES FREDERICK LAVENDER, OF TORONTO, CANADA, ASSIGNOR OF ONE-HALF TO THOMAS FANE, OF SAME PLACE.

WHEEL-TIRE.

SPECIFICATION forming part of Letters Patent No. 503,704, dated August 22, 1893.

Application filed December 27, 1892. Serial No. 456,378. (No model.)

*To all whom it may concern:*

Be it known that I, CHARLES FREDERICK LAVENDER, a citizen of the Dominion of Canada, residing at Toronto, in the county of York and Province of Ontario, Canada, have invented new and useful Improvements in Wheel-Tires, of which the following is a specification.

This invention relates to tires for velocipedes and other vehicles and more especially to that class of pneumatic tires which are made removable from the wheel rim to afford access to the inclosed air tube for repairing the same, when necessary.

The object of my invention is to produce an efficient tire of this kind which may be applied to an ordinary wheel having a flat rim, and which permits ready access to the air tube for repairing it and easy replacement of the tire.

Figure 1:
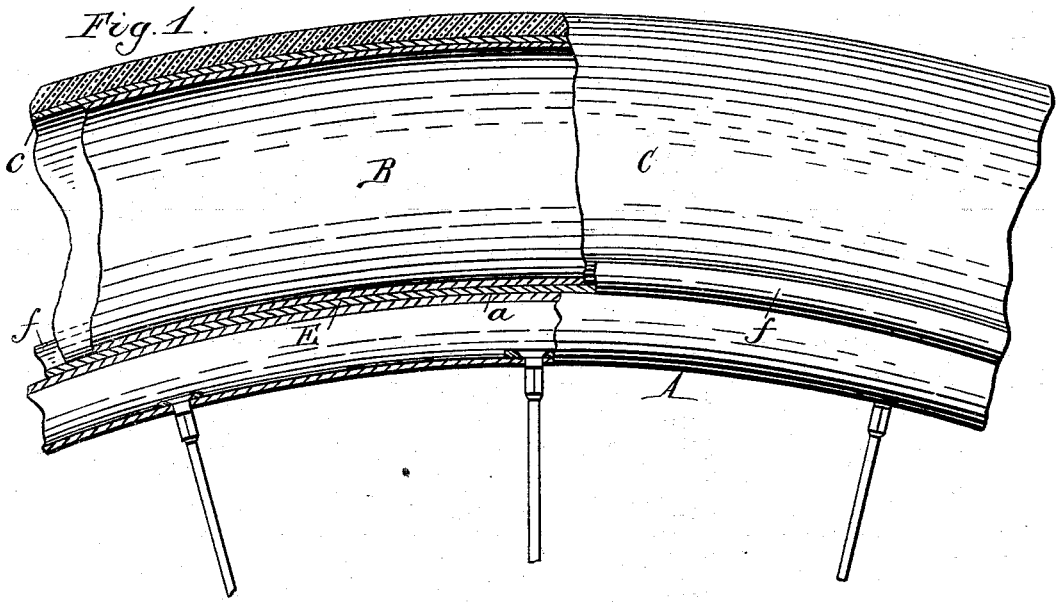
Figure 2:
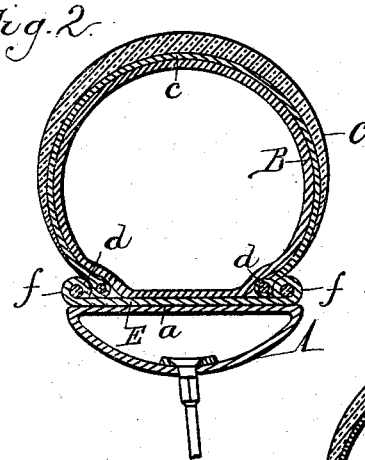
Figure 3:
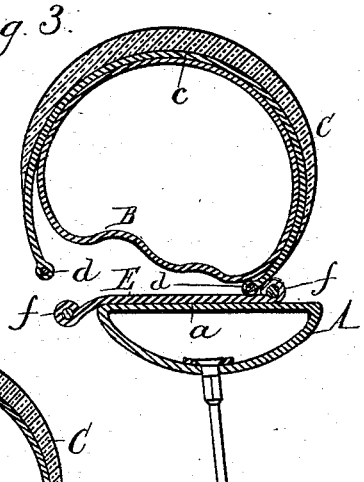
Figure 4:
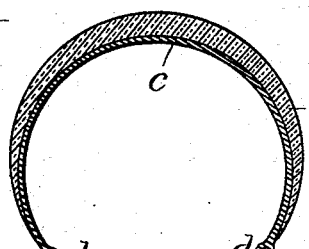
Figures 5, 6:
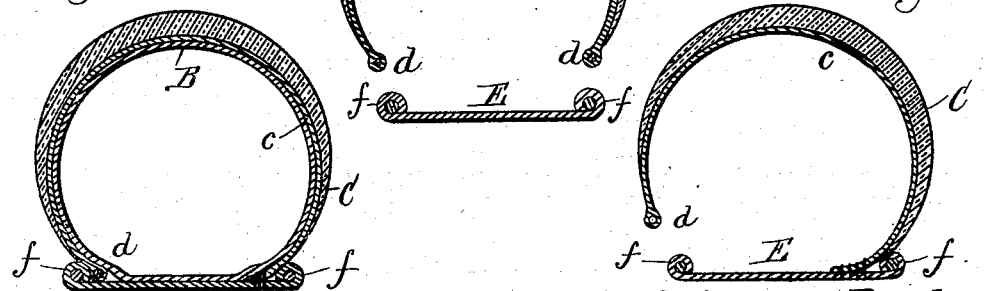

In the accompanying drawings:—Figure 1 is a fragmentary side elevation, partly in section, of a velocipede wheel provided with my improved tire. Fig. 2 is a cross section of the tire, showing the same in place on the wheel rim. Fig. 3 is a similar view, showing the tire shifted laterally on the wheel rim, with the protective envelope opened preparatory to removing the air tube. Fig. 4 is a detached cross section of the protective envelope and its base or bolster. Fig. 5 is a cross section of a modified construction of the tire, showing the parts in their normal positions. Fig. 6 is a similar section, with the protective envelope open, and the air tube omitted.

Like letters of reference refer to like parts in the several views.

A represents the rim of the wheel which is provided with a flat surface $a$ and preferably made hollow, as shown in the drawings, although it may be constructed in the form of a solid band if desired.

B is the air tube which may be of any ordinary construction, and C is the envelope or covering in which the air tube is inclosed, in a well known manner. This envelope is substantially horse-shoe shaped in cross section, as shown, and arranged with its open side opposite the wheel rim. The envelope is preferably tapered from its thickened tread toward its longitudinal edges, as shown, and is provided with a lining $c$, of canvas or similar material, the longitudinal edges of which are thickened or enlarged, as shown at $d$. These edges are preferably enlarged by means of wires or cords around which the lining is doubled and stitched. The wire may, however, be fastened to the lining in any other suitable manner.

E is an independent annular bolster or base resting with its back or outer side against the flat face of the wheel rim and closing the adjacent inner side of the protective envelope. This bolster preferably consists of an endless band of canvas or flexible material, of substantially the same width as the rim, and is provided at its longitudinal edges with ridges, enlargements, or raised portions $f$, which extend entirely around the bolster. These enlargements are preferably formed by folding or doubling the edges of the lining over a wire or cord and securing the same by stitching or otherwise.

The enlarged edges of the envelope of the air tube rests with their outer sides against the inner sides of the ridges or enlargements of the bolster E, and are firmly pressed outward against these ridges by the air tube, when the same is inflated, as shown in Fig. 2, thereby reliably confining the thickened edges of the envelope against outward displacement, and retaining the envelope in its normal closed position. The pressure of the inflated air tube against the outer side of the bolster forces the latter firmly against the flat wheel rim and thereby causes the same to remain upon the rim by its frictional contact therewith.

When it is desired to open the envelope for obtaining access to the inclosed air tube to make repairs, the air tube is deflated or allowed to collapse. The tire is then drawn to one side of the rim, as shown in Fig. 3, when the adjacent edge of the envelope may be withdrawn from the overhanging or unsupported ridge of the bolster and access had to the air tube. In replacing the tire, the detached edge of the envelope is placed against the inner edge of the adjacent ridge of the bolster, the latter is returned to the position shown in Fig. 2, and the air tube again inflated.

In the construction of my improvement just described, both edges of the envelope are detached from the bolster, so that the envelope may be opened from either side.

If desired, one edge of the envelope may be permanently attached to the bolster by stitching or other means, as shown in Figs. 5 and 6, in which case the envelope can be opened only from one side.

My improved tire can be readily applied to a flat wheel-rim without requiring a special construction of the rim and without the use of separate fastenings, thus rendering the tire not only very simple in construction and convenient in use, but intact and complete when separated from the rim.

I claim as my invention—

1. The combination with the air tube and the base or bolster adapted to rest upon the wheel rim, and having a longitudinal enlargement or raised portion, of an open-sided protective envelope inclosing the air tube and having a longitudinal edge arranged on the outer side of said bolster and bearing against the enlargement thereof, substantially as set forth.

2. The combination with the air tube and the base or bolster adapted to rest upon the wheel rim and provided at its edges with ridges or enlargements of an open-sided envelope for the air tube, provided with enlarged edges arranged on the outer side of said bolster and bearing against the inner sides of said ridges, substantially as set forth.

3. The combination with the air tube and the base or bolster adapted to rest upon the wheel rim and provided at its edges with annular ridges or enlargements, of an open-sided envelope for the air tube having a lining provided with enlarged edges which bear against the inner sides of the ridges of said bolster, substantially as set forth.

Witness my hand this 14th day of December, 1892.

CHARLES FREDERICK LAVENDER.

Witnesses:
H. C. PEASE,
H. W. BIRCH.